(12) United States Patent
Shinoda et al.

(10) Patent No.: US 8,687,921 B2
(45) Date of Patent: Apr. 1, 2014

(54) IMAGE PROCESSING APPARATUS, IMAGE PROCESSING METHOD, AND IMAGE PROCESSING PROGRAM

(75) Inventors: Shinichi Shinoda, Hitachi (JP); Yasutaka Toyoda, Mito (JP); Ryoichi Matsuoka, Yotsukaido (JP)

(73) Assignee: Hitachi High-Technologies Corporation, Tokyo (JP)

( * ) Notice: Subject to any disclaimer, the term of this patent is extended or adjusted under 35 U.S.C. 154(b) by 0 days.

(21) Appl. No.: 13/578,651

(22) PCT Filed: Mar. 25, 2011

(86) PCT No.: PCT/JP2011/057274
§ 371 (c)(1),
(2), (4) Date: Sep. 13, 2012

(87) PCT Pub. No.: WO2011/118745
PCT Pub. Date: Sep. 29, 2011

(65) Prior Publication Data
US 2013/0011080 A1 Jan. 10, 2013

(30) Foreign Application Priority Data
Mar. 25, 2010 (JP) ................. 2010-070043

(51) Int. Cl.
*G06K 9/32* (2006.01)
(52) U.S. Cl.
USPC .......... 382/296; 382/276; 382/287; 382/289; 382/293

(58) Field of Classification Search
USPC ................. 382/276, 282, 287, 289, 293, 296; 345/648, 649, 658, 659; 348/583
See application file for complete search history.

(56) References Cited

U.S. PATENT DOCUMENTS

| | | | | |
|---|---|---|---|---|
| 6,466,701 B1 * | 10/2002 | Ejiri et al. | | 382/284 |
| 6,798,924 B2 * | 9/2004 | Ejiri et al. | | 382/284 |
| 2002/0015518 A1 | 2/2002 | Matsuoka | | |
| 2007/0258636 A1 * | 11/2007 | Kudou | | 382/149 |
| 2008/0290274 A1 | 11/2008 | Honda | | |
| 2009/0218491 A1 | 9/2009 | Morokuma et al. | | |
| 2012/0328181 A1 * | 12/2012 | Kitamura et al. | | 382/145 |

FOREIGN PATENT DOCUMENTS

| | | |
|---|---|---|
| JP | 2002-31525 A | 1/2002 |
| JP | 2006-269710 A | 10/2006 |
| JP | 2008-251766 A | 10/2008 |
| WO | WO 2007/094439 A1 | 8/2007 |

OTHER PUBLICATIONS

Corresponding International Search Report with English Translation dated Apr. 26, 2011 (five (5) pages).
Form PCT/ISA/237 (three (3) pages), Apr. 26, 2011.

* cited by examiner

*Primary Examiner* — Ali Bayat
(74) *Attorney, Agent, or Firm* — Crowell & Moring LLP

(57) ABSTRACT

It is an object of the present invention is to provide an image processing technique that can detect the rotation of an observation image of a specimen with high accuracy. An image processing apparatus according to the present invention indirectly corrects a rotation gap between measurement image data and reference image data through wide-angle image data including a measurement part of a specimen (FIG. 1).

17 Claims, 7 Drawing Sheets

(a)     (b)     (c)

IMAGE PROCESSING APPARATUS, IMAGE PROCESSING METHOD, AND IMAGE PROCESSING PROGRAM

TECHNICAL FIELD

The present invention relates to an image processing technique for processing an observation image of a specimen.

BACKGROUND ART

When a semiconductor device is manufactured, in respective processes, in order to check whether a pattern is formed on a substrate in accordance with design, a critical dimension scanning electron microscope or the like has been widely used.

The following Patent Literature 1 describes a technique for comparing design data obtained using CAD (Computer Aided Design) with an image (an SEM image) of a wiring pattern picked up by an SEM (Scanning Electron Microscope) to evaluate a resulting wiring pattern.

The following Patent Literature 2 describes a technique for detecting and correcting the rotation of an SEM image using design data before evaluating a pattern. It is because if an SEM image is rotated, a pattern may be erroneously evaluated.

CITATION LIST

Patent Literature

Patent Literature 1: JP Patent Publication (Kokai) No. 2002-31525A

Patent Literature 2: JP Patent Publication (Kokai) No. 2006-269710A

SUMMARY OF INVENTION

Technical Problem

In recent years, semiconductors have increasingly become finer and pattern shapes have been complicated. For this reason, if there arises a discrepancy between pattern shapes of an SEM image and design data, an influence on the accuracy of pattern evaluation has become more significant than conventional one.

The technique described in the foregoing Patent Literature 2 can perform rotation correction with high accuracy if the pattern shapes of an SEM image and design data are similar to each other. However, if there is a discrepancy between both the shapes, the accuracy of detecting rotation may decrease. Also, it is challenging to accurately detect slight rotation caused by electrification or the like for each image pickup.

The present invention has been made to solve the foregoing problems. It is an object of the present invention is to provide an image processing technique that can detect the rotation of an observation image of a specimen with high accuracy.

Solution to Problem

An image processing apparatus according to the present invention indirectly corrects a rotation gap between measurement image data and reference image data through wide-angle image data that includes a measurement part of a specimen.

Advantageous Effects of Invention

According to the image processing apparatus of the present invention, because a rotation gap between measurement image data and reference image data is indirectly corrected through wide-angle image data, matching between the wide-angle image data and the reference image data and matching between the wide-angle image data and the measurement image data can be carried out with high accuracy. Thereby, even if there is a relatively large rotation gap, the rotation gap can be detected with high accuracy.

DESCRIPTION OF EMBODIMENTS

Embodiment 1

Figure 1:
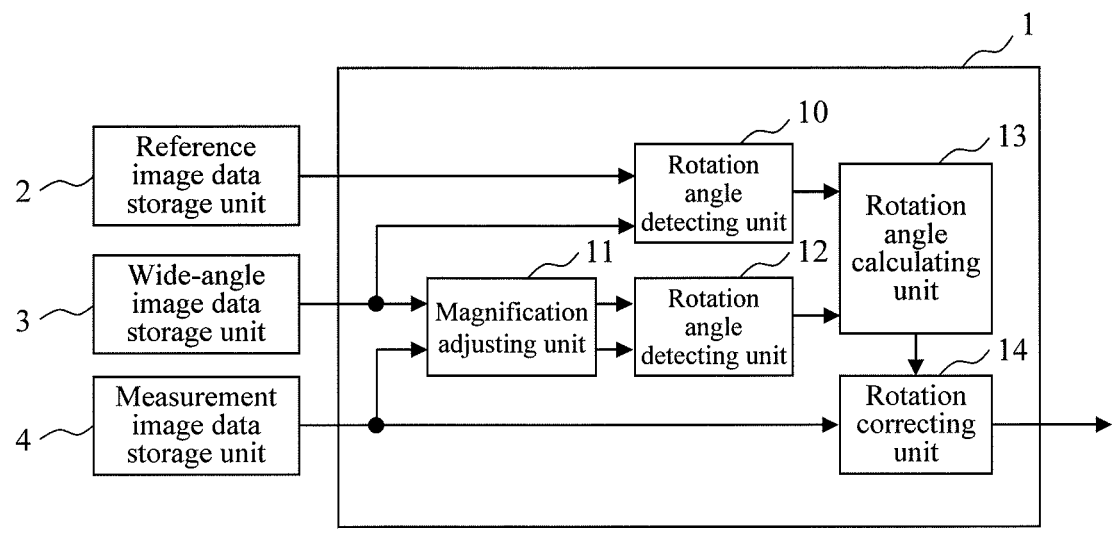
FIG. 1 is a function block diagram of an image processing apparatus 1 according to embodiment 1.

FIG. 1 is a function block diagram of an image processing apparatus 1 according to embodiment 1 of the present invention. The image processing apparatus 1 is an apparatus that processes an observation image of a specimen and includes a reference image data storage unit 2, a wide-angle image data storage unit 3, a measurement image data storage unit 4, a first rotation angle detecting unit 10, a magnification adjusting unit 11, a second rotation angle detecting unit 12, a rotation angle calculating unit 13, and a rotation correcting unit 14.

The reference image data storage unit 2 stores image data of a reference pattern that is compared with a pattern to be measured to evaluate a resulting pattern. For example, a pattern image created based on design data of an integrated circuit, the data being created using CAD, may be reference image data. Further, a pattern image on which correction such as proximity correction is made may be reference image data. Also, a pickup image of a properly-made pattern generated on a substrate may be reference image data.

The wide-angle image data storage unit 3 stores image data (wide-angle image data) obtained by picking up, with a low magnification, an image of a wide region including a pattern to be measured.

The measurement image data storage unit 4 stores image data (measurement image data) obtained by picking up an image of a pattern to be measured. The measurement image data may be an outline image obtained by extracting a pattern of a measurement image. Hereinafter, it is assumed that the measurement image data is outline image data of a measurement image. In the same manner, the reference image data and the wide-angle image data may be outline image data.

The first rotation angle detecting unit 10 detects a rotation gap angle between the reference image data and the wide-angle image data. A detecting technique will be described later with reference to FIG. 3 to FIG. 4.

The second rotation angle detecting unit 12 detects a rotation gap angle between the wide-angle image data and the measurement image data. However, the wide-angle image data and the measurement image data have different image magnifications. Thus, the magnification adjusting unit 11 enlarges or reduces each of the image data items to adjust both the magnifications to each other. The second rotation angle detecting unit 12 detects the rotation gap angle between the wide-angle image data and the measurement image data using the image data items having the adjusted magnification.

The rotation angle calculating unit 13 calculates a rotation gap angle between the reference image data and the measurement image data using the rotation gap angle detected by the first rotation angle detecting unit 10 and the rotation gap angle detected by the second rotation angle detecting unit 12.

The rotation correcting unit 14 performs rotation correction for the measurement image data using the rotation gap angle calculated by the rotation angle calculating unit 13.

The first rotation angle detecting unit 10, the second rotation angle detecting unit 12, and the rotation angle calculating unit 13 may also be integrally formed. This also applies to the following embodiments.

Figure 2:
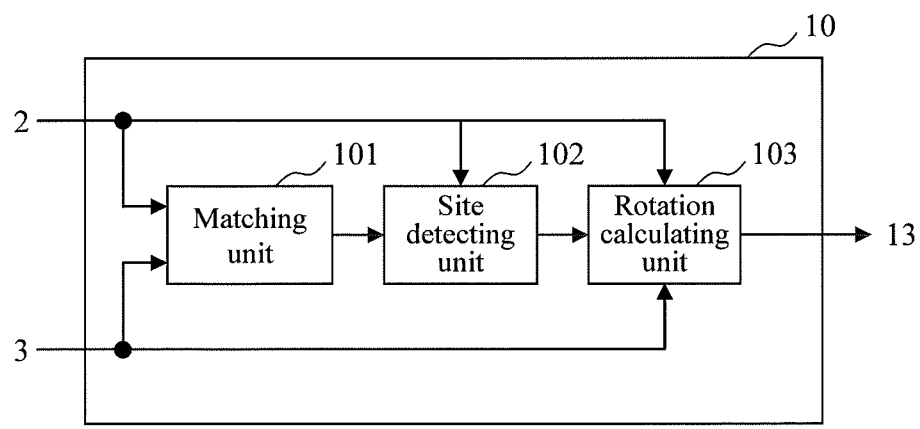
FIG. 2 is a function block diagram of a first rotation angle detecting unit 10.

FIG. 2 is a function block diagram of the first rotation angle detecting unit 10. The rotation angle detecting unit 10 includes a matching unit 101, a site detecting unit 102, and a rotation calculating unit 103.

The matching unit 101 matches the reference image data with the wide-angle image data in a wide area and determines a rough corresponding position at which the wide-angle image data and the reference image data correspond to each other. For example, a region on the reference image data that matches the template is searched for using the wide-angle image data as a template. Then, normalized correlation values between them are calculated and a position having a most significant correlation is detected. Thereby, a position at which the reference image data and the wide-angle image data correspond to each other may be determined.

The site detecting unit 102 detects a pattern on the reference image data, the pattern being used when the reference image data and the wide-angle image data are compared with each other, and determines positions of the detected pattern on the reference image data and on the wide-angle image data. It is desirable that the pattern used herein be a pattern that allows easy comparison between the reference image data and the wide-angle image data, such as a straight line pattern and a corner pattern. The patterns will be illustrated later with reference to FIG. 3.

The rotation calculating unit 103 calculates a rotation angle between the wide-angle image data and the reference image data. A calculating technique will be described later with reference to FIG. 3 to FIG. 4.

Figure 3:
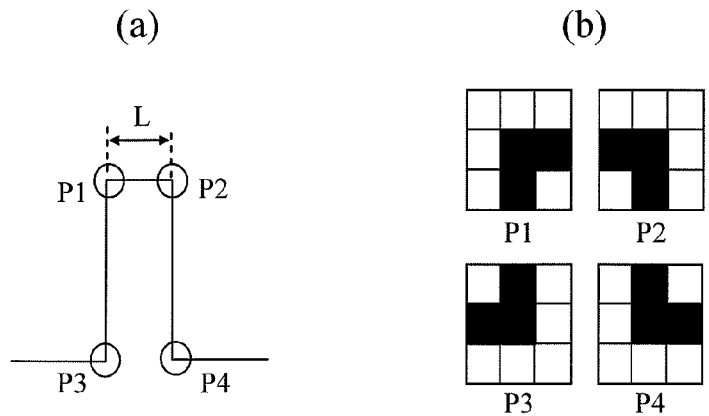
FIG. 3 is a diagram illustrating an example of a pattern detected by a site detecting unit 102.

FIG. 3 is a diagram illustrating an example of a pattern detected by the site detecting unit 102. In this example, a convex pattern is illustrated in FIG. 3(*a*).

The convex pattern shown in FIG. 3(*a*) has corners of four patterns of P1 to P4. The site detecting unit 102 can detect respective corners by pattern matching using corner detection filters of 3×3 pixel matrices corresponding to P1 to P4, as shown in FIG. 3(*b*), for example.

There may be straight lines between the corners. If a part between adjacent corners has a predetermined length or longer, the part may be regarded as a straight line. Also, a line detect filter may be used to detect a straight line. Since pattern shapes on the reference image data are most ideal shapes, sites such as a straight line pattern, a corner pattern, and an endpoint pattern can be easily detected.

The site detecting unit 102 outputs a position of each detected pattern to the rotation calculating unit 103. The rotation calculating unit 103 compares the reference image data and the wide-angle image data with each other on the basis of the positions and calculates a rotation angle between both the image data items.

Figure 4:
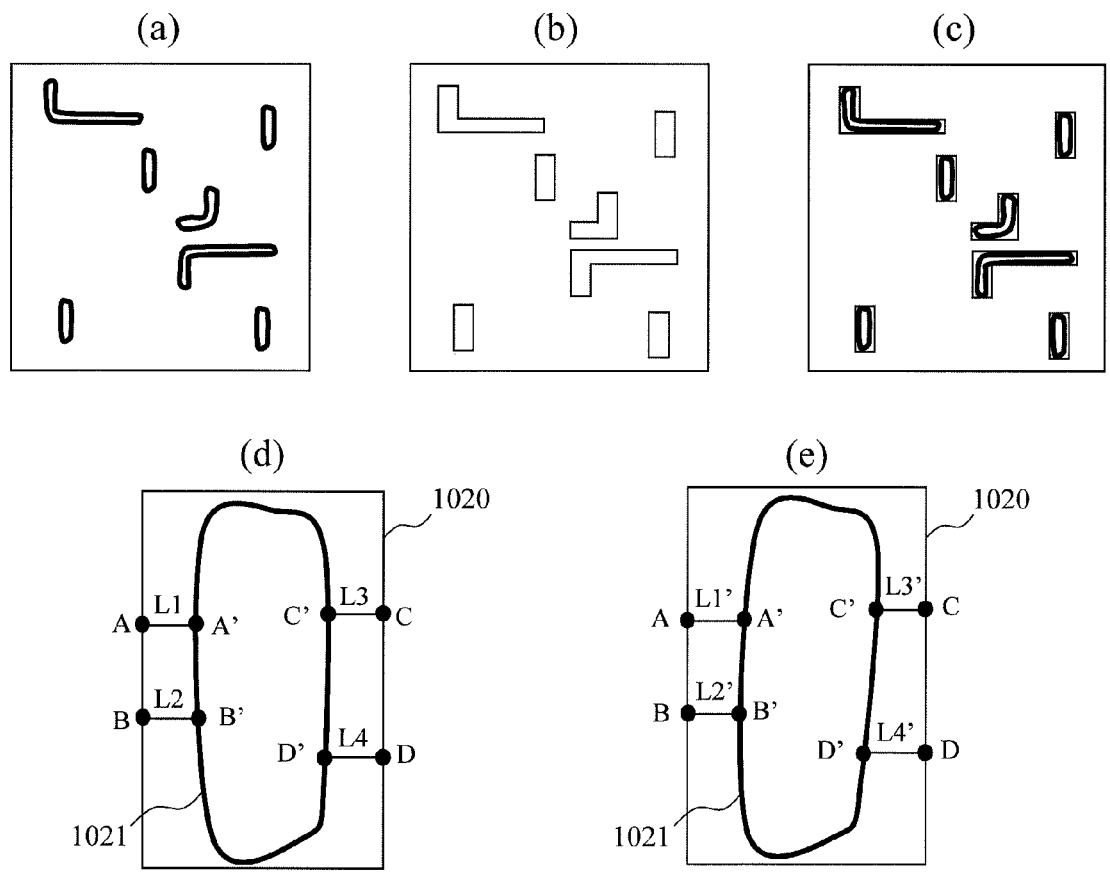
FIG. 4 is a diagram explaining processes for matching wide-angle image data with reference image data.

FIG. 4 is a diagram explaining processes for matching wide-angle image data with reference image data. If wide-angle image data shown in FIG. 4(*a*) is placed on reference image data shown in FIG. 4(*b*) in accordance with the corresponding position obtained by the matching unit 101, a resulting drawing is like FIG. 4(*c*).

The site detecting unit 102 detects straight line patterns illustrated in FIG. 3 from corresponding patterns between wide-angle image data and reference image data. As shown in FIG. 4(*d*) as an example, straight lines of a rectangular pattern of reference image data 1020 are detected and linked to wide-angle image data 1021. A pattern used to link wide-angle image data to reference image data is not limited to a straight line pattern.

The rotation calculating unit 103 calculates, for example, a distance L1 between A in the reference image data 1020 and corresponding A' in the wide-angle image data 1021. Similarly, distances L2 to L4 between B, C, and D in the reference image data 1020 and corresponding B', C', and D' in the wide-angle image data 1021 are calculated.

If there is no rotation gap between the image data items, the distance L1 between A-A', the distance L2 between B-B', the distance L3 between C-C', and the distance L4 between D-D' are substantially the same values. If there is a rotation gap between the image data items, as shown in FIG. 4(*e*), values of a distance L1' between A-A' and a distance L2' between B-B' are different. The rotation calculating unit 103 can calculate a rotation angle between the image data items using a distance from A to B and a difference (an inclination) between the distance L1' and the distance L2'.

It should be noted that FIG. 4 shows an example in which the four points of A to D are used to calculate an inclination of a straight line pattern for illustrative simplicity, but the detection accuracy of a rotation angle can be improved by increasing the number of comparison points or using a longer straight line pattern.

Figure 5:
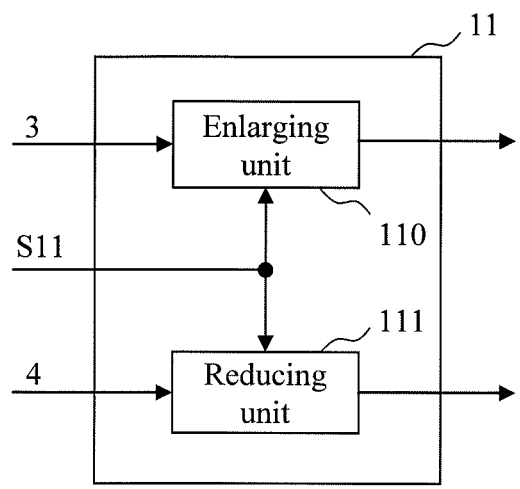
FIG. 5 is a function block diagram of a magnification adjusting unit 11.

FIG. 5 is a function block diagram of the magnification adjusting unit 11. The magnification adjusting unit 11 changes the size of image data so that wide-angle image data and measurement image data have a same image size in the same field of view.

For example, if magnification for picking up wide-angle image data is a low magnification of ¼ of magnification for picking up measurement image data, an enlarging unit 110 enlarges the wide-angle image data 4× and leaves the measurement image data as it is (1×). As a result, the image data items have the same image size in the same field of view. Alternatively, leaving the wide-angle image data as it is (1×), a reducing unit 111 may reduce the measurement image data to ¼. The enlarging unit 110 and the reducing unit 111 may perform the foregoing processes by bilinear processing.

In the foregoing description, although the image pickup magnification of the wide-angle image data has been ¼ of the image pickup magnification of the measurement image data, the magnification may be always a fixed value or may be adjusted using an actual image pickup magnification as needed. For example, it is conceived that image pickup magnification values S11 for imaging wide-angle image data and measurement image data are stored in an appropriate storage device in advance, and an enlargement ratio or a reduction ratio is adjusted using the image pickup magnification values S11 so that the wide-angle image data and the measurement image data have the same image size in the same field of view.

Also, in this example, both the enlarging unit 110 and the reducing unit 111 are provided, but if any one of the image data items is used as it is without enlargement or reduction, one of the enlarging unit 110 and the reducing unit 111 may suffice.

Figure 6:
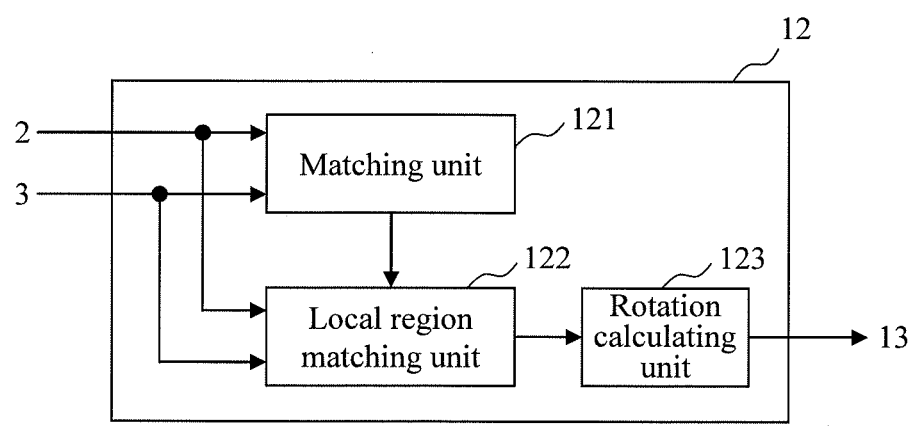
FIG. 6 is a function block diagram of a second rotation angle detecting unit 12.

FIG. 6 is a function block diagram of the second rotation angle detecting unit 12. The second rotation angle detecting unit 12 includes a matching unit 121, a local region matching unit 122, and a rotation calculating unit 123.

The matching unit 121 performs matching between wide-angle image data and measurement image data to determine a corresponding position between the image data items. For example, the wide-angle image data is searched for using the measurement image data as a template. Then, similarly to the matching unit 101, the matching unit 121 calculates normalized correlations to determine a corresponding image position.

The local region matching unit 122 divides an image into a plurality of local regions and performs individual matching for the local regions. This matching is different from the broad matching between reference image data and wide-angle image data.

Figure 7:
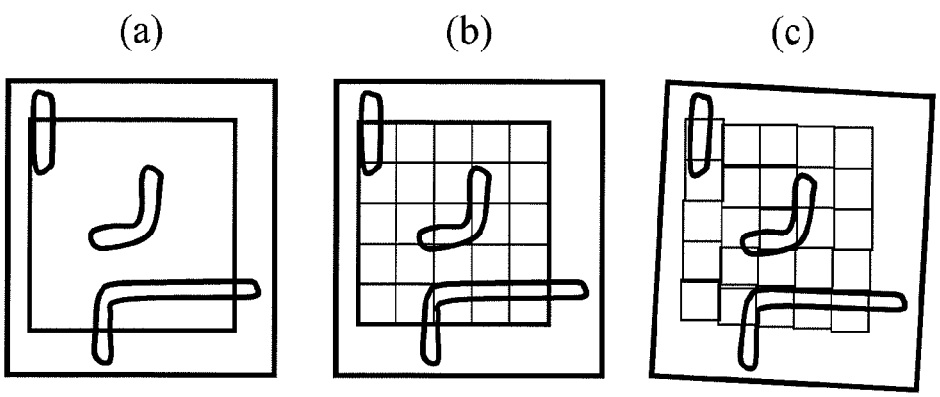
FIG. 7 is a diagram explaining matching processing performed by a local region matching unit 122.

FIG. 7 is a diagram explaining matching processing performed by the local region matching unit 122. FIG. 7(*a*) is an image obtained by superimposing measurement image data and wide-angle image data at the corresponding position determined by the matching unit 121. The local region matching unit 122 divides the measurement image data into 25 (5×5) local regions as shown in FIG. 7(*b*) and performs matching between the measurement image data and the reference image data for each local region.

At the time of matching, the local region matching unit 122 cuts out 25 local regions with reference to the corresponding position determined by the matching unit 121 and decides the cut-out positions as origin coordinates of the local regions. The local region matching unit 122 performs matching by comparing local images to each other with reference to the origin coordinates of the local regions.

If there is no rotation between the image data items, when matching is performed between local regions, the reference image data and the measurement image data should correspond to each other at the origin coordinates. However, if there is rotation between both the image data items, as shown in FIG. 7(*c*), the corresponding position deviates from the origin coordinates depending on a rotation gap.

The local region matching unit 122 determines a gap between the corresponding position and the origin coordinates for each local region. The rotation calculating unit 123 calculates a rotation angle using the gap of each local region determined by the local region matching unit 122.

Figure 8:
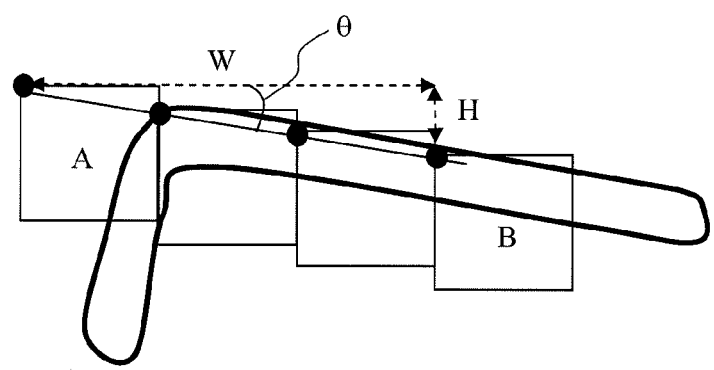
FIG. 8 is a diagram illustrating a technique for calculating a rotation angle using corresponding position discrepancies of local regions.

FIG. 8 is a diagram illustrating a technique for calculating a rotation angle using corresponding position discrepancies of local regions. In an example shown in FIG. 8, if a distance W between a local region A and a local region B and a gap H between the local region A and the local region B are found, a rotation angle θ can be determined.

Figure 9:
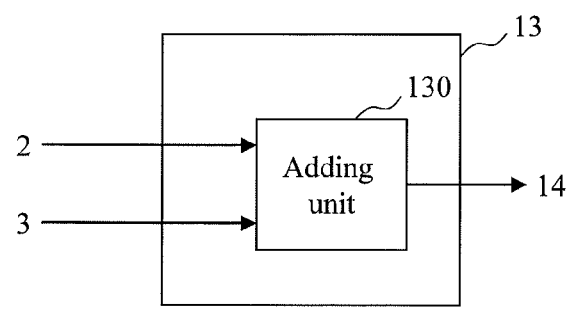
FIG. 9 is a function block diagram of a rotation angle calculating unit 13.

FIG. 9 is a function block diagram of the rotation angle calculating unit 13. The rotation angle calculating unit 13 calculates a rotation angle between reference image data and measurement image data using an adding unit 130. For example, a rotation angle between reference image data and measurement image data can be determined by adding rotation angles θ1 and θ2, the angle θ1 being determined by the first rotation angle detecting unit 10 and between the reference image data and wide-angle image data, and the angle θ2 being determined by the second rotation angle detecting unit 12 and between the wide-angle image data and the measurement image data. The rotation correcting unit 14 performs rotation correction for the measurement image data using a rotation angle between reference image data and measurement image data.

As hereinbefore described, the image processing apparatus 1 according to the embodiment 1 indirectly detects a rotation angle through wide-angle image data instead of performing direct matching between measurement image data and reference image data to detect a rotation angle. Effects provided thereby will be described below.

Because measurement image data is picked up with a high magnification, only a small region can be compared to reference image data, and influence of a rotation gap may be so significant that a rotation angle cannot be correctly detected. In contrast, since wide-angle image data is an image of a wide region, even if there is some rotation gap, matching is relatively easy. Therefore, it is deemed that matching accuracy between wide-angle image data and reference image data is relatively high.

Also, wide-angle image data and measurement image data are image data obtained by picking up a same pattern. Thus, even if some rotation gap has occurred between the times of picking up the wide-angle image data and picking up the measurement image data due to electrification and the like, it is deemed that matching accuracy between them is relatively high.

That is, it is believed that detecting a rotation angle by matching through wide-angle image data offers higher matching accuracy between image data items than the case of matching by directly comparing measurement image data and reference image data. Thus, as a result, a rotation gap between measurement image data and reference image data can be detected with high accuracy.

Embodiment 2

Figure 10:
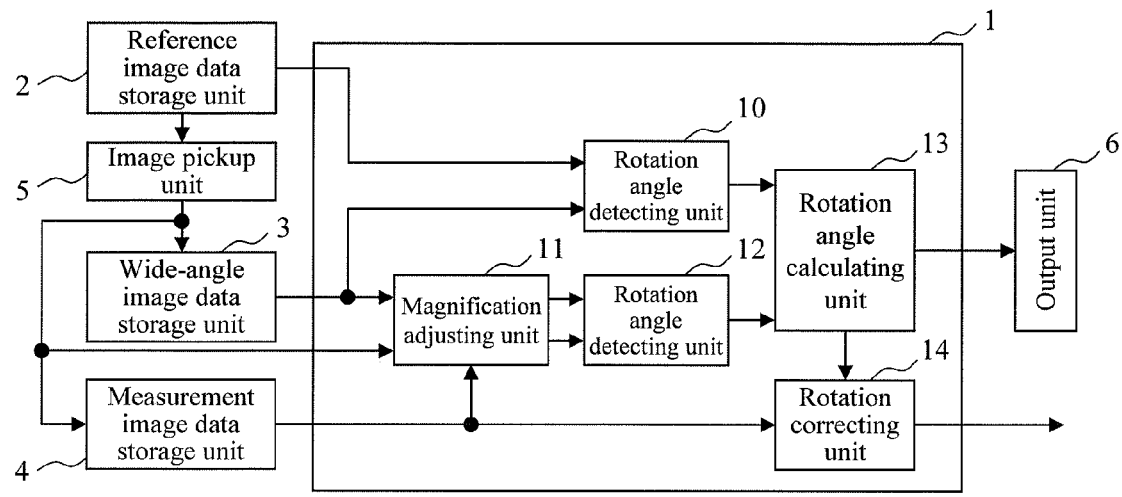
FIG. 10 is a function block diagram of an image processing apparatus 1 according to embodiment 2.

FIG. 10 is a function block diagram of an image processing apparatus 1 according to an embodiment 2 of the present invention. The image processing apparatus 1 according to the embodiment 2 includes an image pickup unit 5 and an output unit 6 in addition to the configuration illustrated in the embodiment 1.

The image pickup unit 5 obtains wide-angle image data and measurement image data by picking up an image of a specimen to be measured and stores the wide-angle image data into the wide-angle image data storage unit 3 and the measurement image data into the measurement image data storage unit 4. Also, magnification values S11 used for imaging are output to the magnification adjusting unit 11. The magnification adjusting unit 11 equalizes image sizes of wide-angle image data and measurement image data using the magnification values S11.

The output unit 6 outputs the rotation angle calculated by the rotation calculating unit 13 by a technique such as screen display, printer output, and data output. As a result, a user can have a definite idea of a rotation gap angle.

The image pickup unit 5 or display section 6 may be similarly provided in another embodiment.

Embodiment 3

In the embodiment 3, a configuration example of an image processing apparatus 1 different from that in the embodiment 1 or 2 is described. Because the processing of each function unit is substantially the same as that in the embodiment 1 or 2, different points will be mainly described below.

Figure 11:
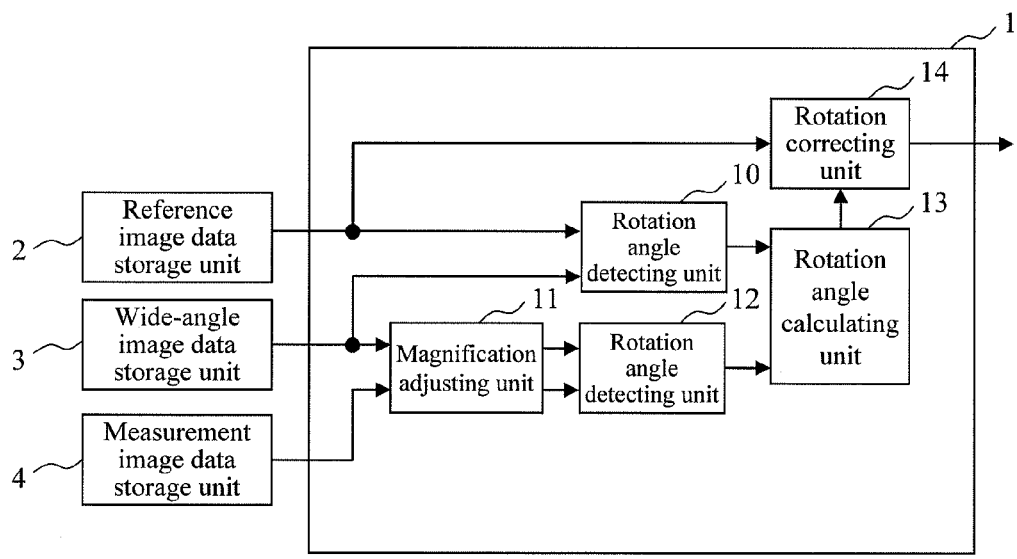
FIG. 11 is a function block diagram of an image processing apparatus 1 according to embodiment 3.

FIG. 11 is a function block diagram of the image processing apparatus 1 according to the embodiment 3. In the embodiment 3, after the rotation angle detecting unit 13 calculates a rotation angle between measurement image data and reference image data, the rotation correcting unit 14 performs rotation correction for the reference image data in place of the measurement image data. Also in this case, the same effects as those in the embodiment 1 can be offered.

Embodiment 4

Figure 12:
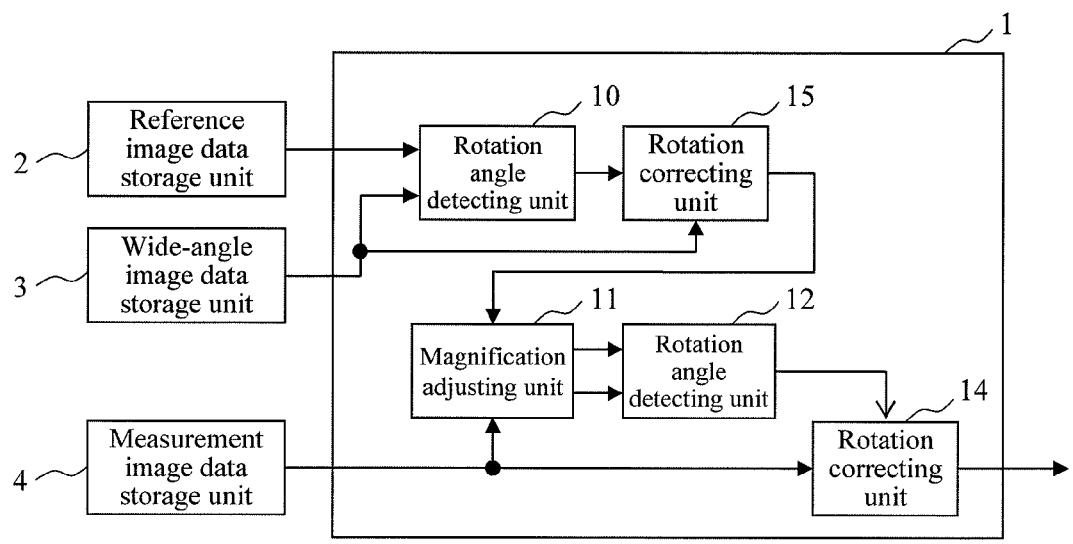
FIG. 12 is a function block diagram of an image processing apparatus 1 according to embodiment 4.

FIG. 12 is a function block diagram of an image processing apparatus 1 according to an embodiment 4 of the present invention. The embodiment 4 is different from the embodiments 1 to 3 in that rotation correction is performed for wide-angle image data before matching is performed between measurement image data and the wide-angle image data. Also, a second rotation correcting unit 15 that performs rotation correction for wide-angle image data is additionally included. Different points from the embodiments 1 to 3 will be mainly described below.

The second rotation correcting unit 15 performs rotation correction for wide-angle image data using a rotation angle between reference image data and wide-angle image data, the rotation angle being detected by the first rotation angle detecting unit 10. The rotation-corrected wide-angle image data is output to the magnification adjusting unit 11.

The magnification adjusting unit 11 adjusts image sizes between the rotation-corrected wide-angle image data and measurement image data to be equal to each other in the same field of view. The subsequent processes are the same as those in the embodiments 1 to 2.

As hereinbefore described, in the same mariner as the embodiments 1 to 3, in the embodiment 4, a rotation gap between reference image data and measurement image data can be detected through wide-angle image data.

Embodiment 5

Figure 13:
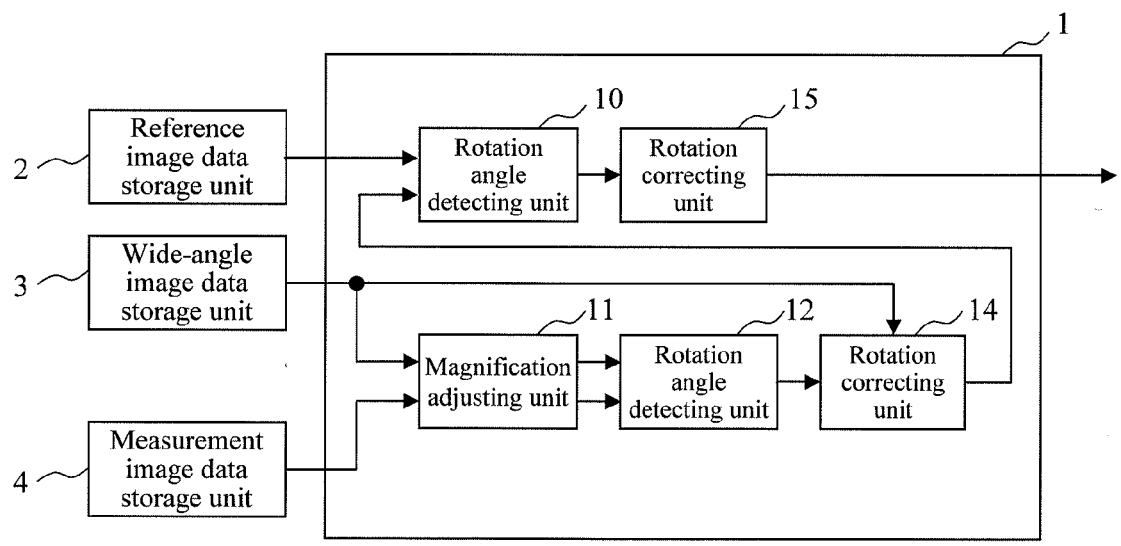
FIG. 13 is a function block diagram of an image processing apparatus 1 according to embodiment 5.

FIG. 13 is a function block diagram of an image processing apparatus 1 according to an embodiment 5 of the present invention. In the embodiment 5, first, matching between wide-angle image data and measurement image data is performed to correct the rotation of the wide-angle image data. Then, matching between the wide-angle image data and reference image data is performed to correct the rotation of the reference image data. Also, the second rotation correcting unit 15 that corrects the rotation of the reference image data is additionally included. Different points from the embodiments 1 to 4 will be mainly described below.

The rotation correcting unit 14 performs rotation correction for wide-angle image data using a rotation gap angle that is between measurement image data and wide-angle image data and detected by the second rotation angle detecting unit 12. The rotation-corrected wide-angle image data is output to the first rotation angle detecting unit 10.

The second rotation correcting unit 15 performs rotation correction for reference image data using a rotation angle that is between the reference image data and wide-angle image data and detected by the first rotation angle detecting unit 10.

As hereinbefore described, in the same manner as the embodiments 1 to 4, in the embodiment 5, a rotation gap between reference image data and measurement image data can be detected through wide-angle image data.

Embodiment 6

Figure 14:
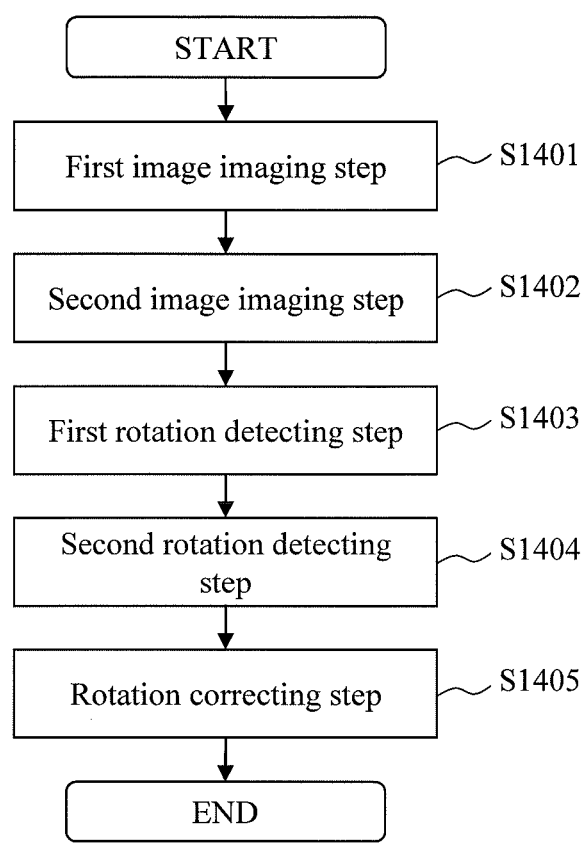
FIG. 14 illustrates an operation flow of the image processing apparatus 1 in embodiment 2.

FIG. 14 is an operation flow of the image processing apparatus 1 in the embodiment 2. Each step in FIG. 14 will be described below. It should be noted that operation flows of the image processing apparatuses 1 according to the other embodiments are different in the order of the steps and image data to be processed from the flow in FIG. 14, but the other points are substantially the same as those in FIG. 14.
(FIG. 14: Steps S1401 to S1402)

The image pickup unit 5 images measurement image data and wide-angle image data. Any one of them may be imaged first.
(FIG. 14: Step S1403)

The first rotation angle detecting unit 10 detects a rotation gap angle between reference image data and wide-angle image data.
(FIG. 14: Step S1404)

The second rotation angle detecting unit 12 detects a rotation gap angle between the wide-angle image data and measurement image data.
(FIG. 14: Step S1405)

The rotation angle calculating unit 13 calculates a rotation gap angle between the reference image data and the measurement image data using the rotation gap angles obtained in steps S1403 to S1404. The rotation correcting unit 14 performs rotation correction for the measurement image data using the rotation gap angle.

Embodiment 7

In the foregoing embodiments 1 to 6, the wide-angle image data has been image data picked up with a low magnification compared with a magnification for picking up measurement image data. However, the image data is not limited to a low-magnification data, and data of an image region larger than measurement image data and including the measurement image data may also be used.

For example, it may be conceived to use an image obtained by picking up a plurality of images with a same magnification as that of a measurement image and combining the images as a wide image by panoramic processing. By combining the images with each other with rotation correction being performed between the images, a level of the rotation between the images to be panoramically combined can be decreased.

It is noted that if image data is rotated at the start of panoramic combining, because subsequent image data items are rotation corrected in accordance with an angle of the rotation, an entire panoramic combined image will be rotated accordingly. The rotation is compared with reference image data, and the rotation of the panoramically combined image data may be detected by the same method as described above.

Embodiment 8

In the descriptions of the foregoing embodiments 1 to 7, matching is performed between the image data items to determine a corresponding position of them and a rotation angle is detected. However, if there is a rotation gap, a rotation angle as well as a corresponding position may not be correct.

Thus, after performing rotation correction for image data, the rotation correcting unit 14 or the second rotation correcting unit 15 performs matching between the image data items again to determine a corresponding position, and if there is a position discrepancy, the rotation correcting unit 14 or 15 may carry out position correction.

Embodiment 9

In the foregoing embodiments 1 to 8, when wide-angle image data is picked up, if the number of patterns included in the wide-angle image data is small, since comparison targets are few, it is not preferable in view of detection accuracy.

Thus, the image pickup unit 5 adjusts an image pickup position or an image pickup magnification so that the number of patterns in wide-angle image data is equal to or greater than a predetermined threshold. Specifically, each time a wide-angle image is picked up, patterns in the wide-angle image data are detected by the technique as illustrated in FIG. 3, for example. If the number of patterns is smaller than a predetermined threshold, an image pickup position or an image pickup magnification is changed and then a wide-angle image is picked up again. By repeating the process, wide-angle image data including patterns of a number of a predetermined threshold or more can be obtained.

Embodiment 10

In the foregoing embodiments 1 to 9, each storage unit included in the image processing apparatus 1 may be composed of, for example, a writable storage device such as an HDD (Hard Disk Drive) and a memory device.

The image pickup unit 5 may be composed of an image pickup device such as a critical dimension scanning electron microscope and a control device therefor.

Also, the other function units may be composed of hardware such as a circuit device for providing the functions, or may be composed of an arithmetic unit such as a microcomputer and a CPU (Central Processing Unit) and software that prescribes an operation of the arithmetic unit. Additionally, software that provides operations of these function units may be installed in a computer so that the computer may be configured as the image processing apparatus 1.

REFERENCE SIGNS LIST

1: image processing apparatus, 2: reference image data storage unit, 3: wide-angle image data storage unit, 4: measurement image data storage unit, 5: image pickup unit, 6: output unit, 10: first rotation angle detecting unit, 101: matching unit, 102: site detecting unit, 103: rotation calculating unit, 11: magnification adjusting unit, 110: enlarging unit, 111: reducing unit, 12: second rotation angle detecting unit, 121: matching unit, 122: local region matching unit, 123: rotation calculating unit, 13: rotation angle calculating unit, 130: adding unit, 14: rotation correcting unit, and 15: second rotation correcting unit.

The invention claimed is:

1. An image processing apparatus for processing an observation image of a specimen, the apparatus comprising:
a measurement image data storage unit that stores measurement image data obtained by imaging a measurement part on a specimen;
a wide-angle image data storage unit that stores wide-angle image data obtained by imaging a wide angle region including the measurement part;
a reference image data storage unit that stores reference image data used as a reference to determine whether or not the measurement part has a desired pattern;
a rotation angle calculating unit that calculates a rotation angle of image data; and
a rotation correcting unit that performs rotation correction for image data,
wherein the rotation angle calculating unit calculates a rotation gap angle between the measurement image data, the wide-angle image data, and the reference image data, and
the rotation correcting unit corrects a rotation gap between the measurement image data and the reference image data using the rotation gap angle.

2. The image processing apparatus according to claim 1, wherein
the rotation angle calculating unit calculates:
a first rotation gap angle between the wide-angle image data and the reference image data;
a second rotation gap angle between the wide-angle image data and the measurement image data; and
a rotation gap angle between the reference image data and the measurement image data using the first rotation gap angle and the second rotation gap angle, and
the rotation correcting unit corrects a rotation gap of the measurement image data using the rotation gap angle.

3. The image processing apparatus according to claim 2, further comprising a magnification adjusting unit that enlarges or reduces image data, wherein
the magnification adjusting unit enlarges or reduces the measurement image data or the wide-angle image data to adjust magnifications, and
the rotation angle calculating unit calculates the second rotation gap angle using the magnification-adjusted wide-angle image data and the reference image data.

4. The image processing apparatus according to claim 1, wherein
the rotation angle calculating unit calculates:
a first rotation gap angle between the wide-angle image data and the reference image data;
a second rotation gap angle between the wide-angle image data and the measurement image data; and
a rotation gap angle between the measurement image data and the reference image data using the first rotation gap angle and the second rotation gap angle, and
the rotation correcting unit corrects a rotation gap of the reference image data using the rotation gap angle.

5. The image processing apparatus according to claim 4, further comprising a magnification adjusting unit that enlarges or reduces image data, wherein
the magnification adjusting unit enlarges or reduces the measurement image data or the wide-angle image data to adjust magnifications, and
the rotation angle calculating unit calculates the second rotation gap angle using the magnification-adjusted wide-angle image data and the reference image data.

6. The image processing apparatus according to claim 1, further comprising:
a first rotation gap angle detecting unit that calculates a first rotation gap angle between the wide-angle image data and the reference image data;
a first rotation gap correcting unit that corrects a rotation gap between the reference image data and the wide-angle image data using the first rotation gap angle;

a second rotation gap angle detecting unit that calculates a second rotation gap angle between the wide-angle image data corrected by the first rotation gap correcting unit and the measurement image data; and a second rotation gap correcting unit that corrects a rotation gap between the wide-angle image data and the measurement image data using the second rotation gap angle, wherein the rotation angle calculating unit includes the first rotation gap angle detecting unit and the second rotation gap angle detecting unit, and the rotation correcting unit includes the first rotation gap correcting unit and the second rotation gap correcting unit.

7. The image processing apparatus according to claim 6, further comprising a magnification adjusting unit that enlarges or reduces image data, wherein the magnification adjusting unit enlarges or reduces the wide-angle image data corrected by the first rotation gap correcting unit or the measurement image data to adjust magnifications, and the second rotation gap angle calculating unit calculates the second rotation gap angle using the magnification-adjusted wide-angle image data and the reference image data.

8. The image processing apparatus according to claim 1, further comprising:

a first rotation gap angle detecting unit that calculates a first rotation gap angle between the wide-angle image data and the measurement image data;

a first rotation gap correcting unit that corrects a rotation gap between the measurement image data and the wide-angle image data using the first rotation gap angle;

a second rotation gap angle detecting unit that calculates a second rotation gap angle between the wide-angle image data corrected by the first rotation gap correcting unit and the reference image data; and a second rotation gap correcting unit that corrects a rotation gap between the wide-angle image data and the reference image data using the second rotation gap angle, wherein the rotation angle calculating unit includes the first rotation gap angle detecting unit and the second rotation gap angle detecting unit, and the rotation correcting unit includes the first rotation gap correcting unit and the second rotation gap correcting unit.

9. The image processing apparatus according to claim 8, further comprising a magnification adjusting unit that enlarges or reduces image data, wherein the magnification adjusting unit enlarges or reduces the measurement image data or the wide-angle image data to adjust magnifications, and the first rotation gap angle calculating unit calculates the first rotation gap angle using the magnification-adjusted wide-angle image data and the measurement image data.

10. The image processing apparatus according to claim 1, wherein the measurement image data, the wide-angle image data, and the reference image data are image data extracted in outline extracting processing.

11. The image processing apparatus according to claim 1, further comprising an outputting unit that outputs a calculation result from the rotation angle calculating unit.

12. The image processing apparatus according to claim 1, wherein the wide-angle image data is image data created in panoramic combining processing.

13. The image processing apparatus according to claim 1, wherein the rotation correcting unit detects a position discrepancy between rotation-corrected image data items and corrects the position discrepancy.

14. The image processing apparatus according to claim 1, further comprising an imaging unit that images the wide angle region to obtain the wide-angle image data, wherein the imaging unit determines an imaging position so that density of patterns included in the wide angle region is equal to or higher than a predetermined threshold.

15. The image processing apparatus according to claim 1, further comprising an imaging unit that images the wide angle region to obtain the wide-angle image data, wherein the imaging unit determines an imaging magnification so that density of patterns included in the wide angle region is equal to or higher than a predetermined threshold.

16. An image processing method for processing an observation image of a specimen, the method comprising the steps of:

obtaining measurement image data obtained by imaging a measurement part on a specimen;

obtaining wide-angle image data obtained by imaging a wide angle region including the measurement part;

obtaining reference image data used as a reference to determine whether or not the measurement part has a desired pattern;

calculating a rotation angle of image data; and performing rotation correction for image data, wherein the calculating a rotation angle calculates a rotation gap angle between the measurement image data, the wide-angle image data, and the reference image data, and the performing rotation correction corrects a rotation gap between the measurement image data and the reference image data using the rotation gap angle.

17. An image processing program embodied on a non-transitory computer-readable medium that causes a computer to execute an image processing method comprising:

obtaining measurement image data obtained by imaging a measurement part on a specimen;

obtaining wide-angle image data obtained by imaging a wide angle region including the measurement part;

obtaining reference image data used as a reference to determine whether or not the measurement part has a desired pattern;

calculating a rotation angle of image data; and performing rotation correction for image data, wherein the calculating a rotation angle calculates a rotation gap angle between the measurement image data, the wide-angle image data, and the reference image data, and the performing rotation correction corrects a rotation gap between the measurement image data and the reference image data using the rotation gap angle.

* * * * *